United States Patent
He

(10) Patent No.: US 9,166,643 B2
(45) Date of Patent: Oct. 20, 2015

(54) METHOD FOR CORRECTING RECEIVER IN TDD SYSTEM AND DEVICES ASSOCIATED THEREWITH

(71) Applicant: Fan He, Chengdu (CN)

(72) Inventor: Fan He, Chengdu (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 145 days.

(21) Appl. No.: 13/664,493

(22) Filed: Oct. 31, 2012

(65) Prior Publication Data

US 2013/0107765 A1   May 2, 2013

(30) Foreign Application Priority Data

Nov. 1, 2011   (CN) .......................... 2011 1 0339384

(51) Int. Cl.
  *H04W 24/08*   (2009.01)
  *H04B 1/30*   (2006.01)
(52) U.S. Cl.
  CPC ............ *H04B 1/30* (2013.01); *H04B 2001/305* (2013.01)
(58) Field of Classification Search
  None
  See application file for complete search history.

(56) References Cited

U.S. PATENT DOCUMENTS

| | | | | |
|---|---|---|---|---|
| 5,309,429 A * | 5/1994 | Fukuda | ........................ | 370/280 |
| 5,640,698 A * | 6/1997 | Shen et al. | ..................... | 455/323 |
| 6,115,584 A * | 9/2000 | Tait et al. | ........................ | 455/73 |
| 6,192,225 B1 * | 2/2001 | Arpaia et al. | ............. | 455/196.1 |
| 6,370,372 B1 * | 4/2002 | Molnar et al. | ................ | 455/323 |
| 7,031,668 B2 * | 4/2006 | Darabi et al. | .................... | 455/75 |
| 7,120,412 B2 * | 10/2006 | Anand | .......................... | 455/260 |
| 7,203,472 B2 * | 4/2007 | Seppinen et al. | .......... | 455/226.1 |
| 7,324,584 B1 * | 1/2008 | Vigneron et al. | ............. | 375/150 |
| 7,876,265 B2 * | 1/2011 | Black et al. | .................... | 342/450 |
| 8,219,055 B2 * | 7/2012 | Harpak et al. | ............. | 455/226.1 |
| 8,270,522 B2 * | 9/2012 | Xie et al. | ....................... | 375/279 |
| 8,335,285 B2 * | 12/2012 | Nakayama | ..................... | 375/346 |
| 2003/0139167 A1 * | 7/2003 | Ciccarelli et al. | ........... | 455/324 |
| 2003/0176174 A1 | 9/2003 | Seppinen et al. | | |
| 2005/0136868 A1 | 6/2005 | Jun et al. | | |
| 2005/0225388 A1 * | 10/2005 | Ramachandran et al. | .... | 330/150 |
| 2006/0009180 A1 * | 1/2006 | Xu et al. | ..................... | 455/226.1 |
| 2006/0068739 A1 * | 3/2006 | Maeda et al. | ................. | 455/295 |
| 2006/0109893 A1 * | 5/2006 | Chen et al. | ..................... | 375/219 |
| 2007/0123188 A1 | 5/2007 | Mo et al. | | |
| 2008/0025437 A1 * | 1/2008 | Huynh | .......................... | 375/324 |
| 2010/0119008 A1 * | 5/2010 | Pal | ................................ | 375/297 |
| 2012/0235709 A1 * | 9/2012 | Wenink | .......................... | 327/105 |

FOREIGN PATENT DOCUMENTS

CA          2267372      *  4/1998   ............... H04Q 7/30

* cited by examiner

*Primary Examiner* — Hassan Kizou
*Assistant Examiner* — Tejis Daya
(74) *Attorney, Agent, or Firm* — Coats & Bennett, PLLC

(57) ABSTRACT

The present invention discloses a Zero-IF receiver in a Time division Duplex TDD system, a correction method therefor and a base station associated therewith. The Zero-IF receiver comprises a Radio Frequency RF circuit, a baseband circuit, and a correction circuit for correcting baseband signals from the baseband circuit based on correction parameters. Said Zero-IF receiver further comprises a training signal providing part for providing a training signal to train the correction circuit to adapt said correction parameters, and a training signal coupling part for coupling said training signal to the baseband circuit during an idle period of the Zero-IF receiver to enable the correction circuit to adapt said correction parameters based on said training signal. The present invention provides stable and reliable training signals that can be used to adapt correction parameters of a correction circuit to improve receiver performance.

20 Claims, 8 Drawing Sheets

METHOD FOR CORRECTING RECEIVER IN TDD SYSTEM AND DEVICES ASSOCIATED THEREWITH

PRIORITY CLAIM

The present application claims the benefit of the filing date of Chinese Patent Application No. 201110339384.6 filed on Nov. 1, 2011.

TECHNICAL FIELD

The present invention relates to Time Division Duplex (TDD) system, and more specifically, to methods for correcting a receiver in a TDD system and devices associated therewith.

BACKGROUND

Compared with super-heterodyne receiver, a zero intermediate-frequency (Zero-IF) receiver down converts radio frequency (RF) signals to baseband directly. It makes the design of a receiver simpler and easier in term of frequency planning. Also it is a cost-efficient solution.

However, due to inherent circuit characteristics of a Zero-IF receiver, it suffers from problems such as DC offset and I/Q mismatch, which would result in degradation of the overall radio performance of the Zero-IF receiver. Currently, a common solution for correction is to add a digital engine in a receiver after analog to digital (AD) conversion of received signals so as to correct signal errors induced by the DC offset and I/Q mismatch, which, however, requires training a correction engine with a training signal in accordance with a correction algorithm.

In an existing receiver of a wireless communication system, a common method is to adopt a blind estimation in a correction process (i.e. a training signal to be used is unknown in advance). Taking a receiver in a base station as an example, such receiver generally employs a received user equipment (UE) signal as training signal. The power of a received UE signal is unpredictable. It may be very low or very high, or may change very fast; and in an extreme situation, there may be even no UE in the network. Thus, a correction made based on such training signals may not converge. Moreover, the correction quality is heavily dependent on the statistic characteristics of received UE signals. However, the number of UEs always dynamically varies, and the received UE signals are actually mixed signals from different UEs, thus the statistic characteristic of the received UE signals may change greatly, which would result in degradation of the correction quality in a Zero-IF receiver.

Since incoming signals to be received are difficult to predict, a correction made based on such training signals would lead to unstable performance of a correction engine or increased complexity of a correction algorithm in a wireless communication system. Meanwhile, correction should be a real-time process in consideration of the ageing problem. Accordingly, in many cases compromises have to be made between algorithm performance and complexity.

The above problems prevent Zero-IF receivers from being widely used in a wireless communication system.

SUMMARY

An objective of the present invention is to provide an improved method and device to alleviate, relieve or even eliminate one or more of the above-mentioned problems.

The present invention is based on the following concept: as for a TDD system, correction of a Zero-IF receiver may be deployed in view of two special features thereof. Firstly, a TDD system is of a Time Division Duplex structure, it means that a receiver is idle when a transmitter transmits. Secondly, since the transmitter and receiver perform transmission and reception on the same frequency, it allows correction of the Zero-IF receiver using transmitted signals.

These features of a TDD system make a Zero-IF receiver easy to use.

According to a first aspect of the present invention, a Zero-IF receiver in a transceiver of a Time Division Duplex TDD system is described. The Zero-IF receiver comprises: a Radio Frequency (RF) circuit for processing a received RF signal; a baseband circuit for converting the RF signal from the RF circuit to a baseband signal and processing the baseband signal, and a correction circuit for correcting the baseband signal based on correction parameter(s). The Zero-IF receiver further comprises: a training signal providing part for providing a training signal for adaptation of the correction parameters, and a training signal coupling part for coupling the training signal to the baseband circuit during idle period of the Zero-IF receiver so as to enable the correction circuit to adapt the correction parameter based on the training signal.

According to an embodiment of the present invention, when the Zero-IF receiver is used as the receiving path of a transceiver, the training signal providing part provides a signal being transmitted on the transmitting path of the transceiver as training signal. Preferably, the training signal providing part inserts a predefined sequence in a predetermined time slot for transmission on the transmitting path, and the training signal coupling part performs the coupling at least during the predetermined time slot so that the predefined sequence is entirely coupled to the correction circuit. Preferably, the training signal coupling part couples the training signal to the baseband circuit by reflecting a signal transmitted on the transmitting path to the RF circuit during a guard period between a transmitting period for the transmitting path and a receiving period for the receiving path.

According to another embodiment of the present invention, the training signal providing part comprises a dedicated upconversion transmitting circuit for up converting a predefined sequence generated in baseband to provide the training signal.

According a further embodiment of the present invention, the training signal providing part comprises a dedicated Local Oscillator (LO)-based signal generation circuit for generating a continuous sinusoidal wave single frequency signal to provide the training signal. The frequency of the single frequency signal is consistent with that of a LO used in the baseband circuit and is within the range of an effective receiving frequency band of the Zero-IF receiver.

Preferably, the training signal coupling part performs the coupling during all of or pre-selected portions of the idle period.

According to a second aspect of the present invention, a method for correcting a Zero-IF receiver in a transceiver of a Time Division Duplex TDD system is provided. The Zero-IF receiver comprises a training signal providing part and a training signal coupling part. The method comprises steps of: providing a training signal for adapting correction parameters in a correction circuit of the Zero-IF receiver by the training signal providing part, coupling the training signal to a baseband circuit of the Zero-IF receiver by the training signal coupling part when the Zero-IF receiver is in its idle period, and receiving the training signal from the baseband circuit and adapting correction parameters based on the training signal by the correction circuit to correct a baseband signal from the baseband circuit.

According to a third aspect of the present invention, the present invention further provides a base station comprising a Zero-IF receiver as described above.

These and other aspects of the present invention would become apparent from the embodiments described as follows, and would be set forth by reference of these embodiments.

BRIEF DESCRIPTION OF THE DRAWINGS

Those skilled in the art would better understand the present invention by reference to the following drawings in combination with accompanied explanation, and a plurality of objects and advantages of the present invention would become more apparent.

In all the figures, like reference signs refer to like elements.

DETAILED DESCRIPTION

Those skilled in the art shall understand that the description as provided below is for the purpose of illustration rather than limitation. Those skilled in the art shall understand that there are a lot of variations within the scope of the spirit of the present invention and the claims as enclosed. In addition, in order not to obscure the description of the present invention, details of well-known functions and structures are omitted from the present description.

Figure 1:
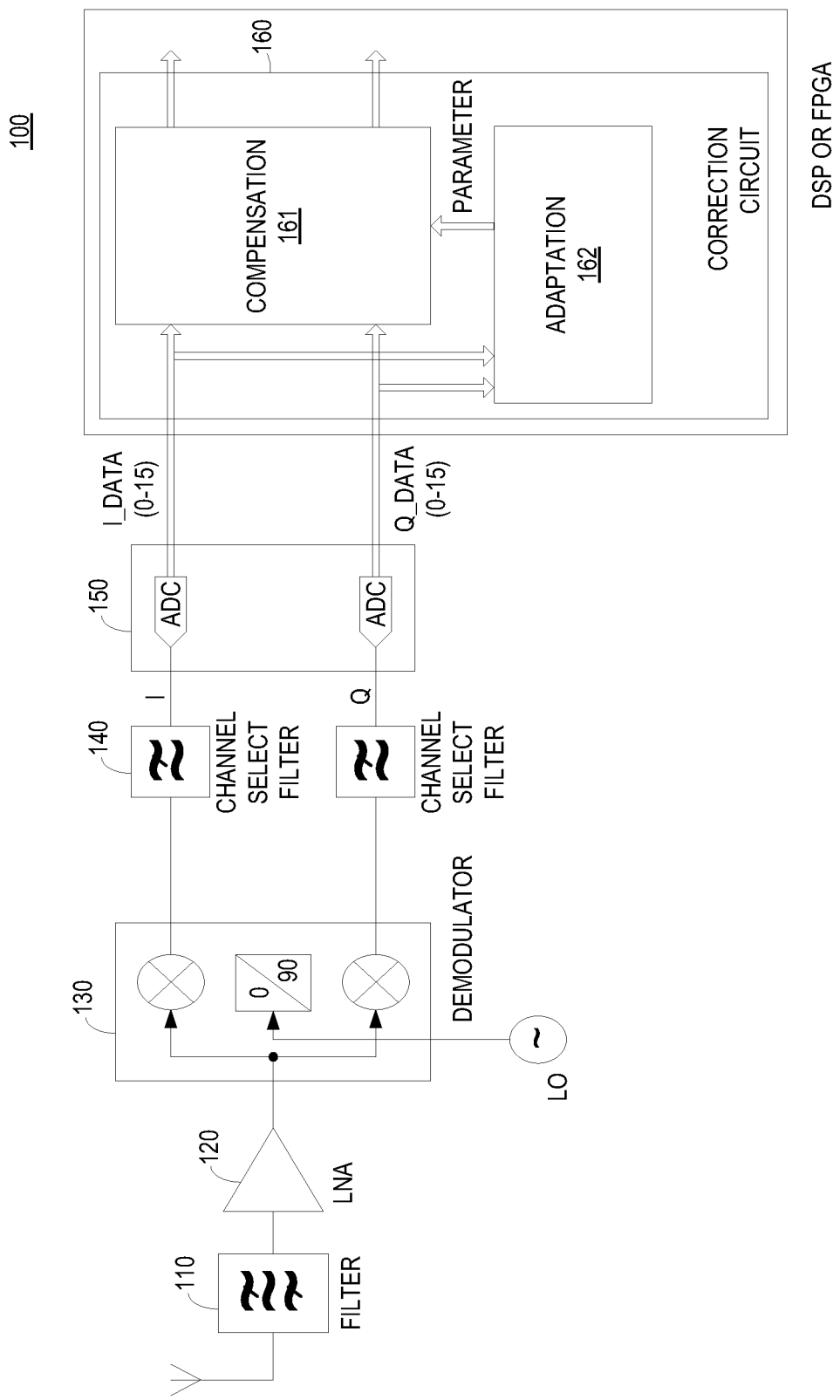
FIG. 1 shows a general structure of a Zero-IF receiver according to the prior art.

FIG. 1 shows a general structure of a Zero-IF receiver 100 according to the prior art. As shown in FIG. 1, the Zero-IF receiver 100 comprises a Radio Frequency (RF) circuit part and a baseband circuit part.

The RF circuit receives a RF signal from an antenna and processes it. The RF circuit comprises a filter 100 and a low noise amplifier (LNA) 120, which perform filtering and amplifying on the received RF signal.

The baseband circuit receives a signal from the RF circuit and processes it. The baseband circuit comprises a demodulator 130 for demodulating the RF signal (e.g. converting the signal), a channel select filter 140 for performing channel select for the demodulated signal, and an analog to digital converter (ADC) 150 for converting the analog signal output from the channel select filter into a digital signal.

The demodulator 130 performs conversion processing (e.g., downconversion processing) on the RF signal by using inphase (I) and quadrature (Q) signals output from a Local Oscillator (LO), and outputs two baseband signals. The channel select and AD conversion are simultaneously performed on the two baseband signals.

As mentioned above, since Zero-IF structure suffers from problems such as DC offset and I/Q mismatch, a Zero-IF receiver 100 further comprises a correction circuit 160 after the AD conversion in order to correct errors introduced by the problems. The correction circuit 160 corrects a received baseband signal using a correction algorithm. The correction algorithm performs correction using one or more correction parameters. Because correction parameters need to be adapted to circuit condition or circuit characteristic of the receiver, a real-time adaptation is needed for them in order to ensure correction performance. To this end, as shown in FIG. 1, the correction circuit 160 comprises an adapting module 162 for adapting the correction parameters, which achieves the adaptation by using a training signal to perform training and estimation such that the adapted correction parameters can better match current circuit condition or circuit characteristic. The correction circuit 160 further comprises a compensating module 161 for performing compensation or other corrections on received baseband signals in accordance with a correction algorithm and based on correction parameters received from the adapting module 162. The correction circuit 160 may be implemented in a form of a digital signal processor (DSP) or a field programmable gate array (FPGA), for example.

Since correction performance and even receiving performance of a receiver are largely determined by correction parameters, a stable, reliable and high-quality training signal is required to train a correction circuit in order to obtain accurate correction parameters that best match the circuit characteristic of the receiver circuit.

Based on TDD system's characteristics, the present invention proposes solutions suitable for correcting a Zero-IF receiver used in a TDD system. In the following, various aspects of embodiments of the present invention are described in combination with the drawings.

Figure 2:
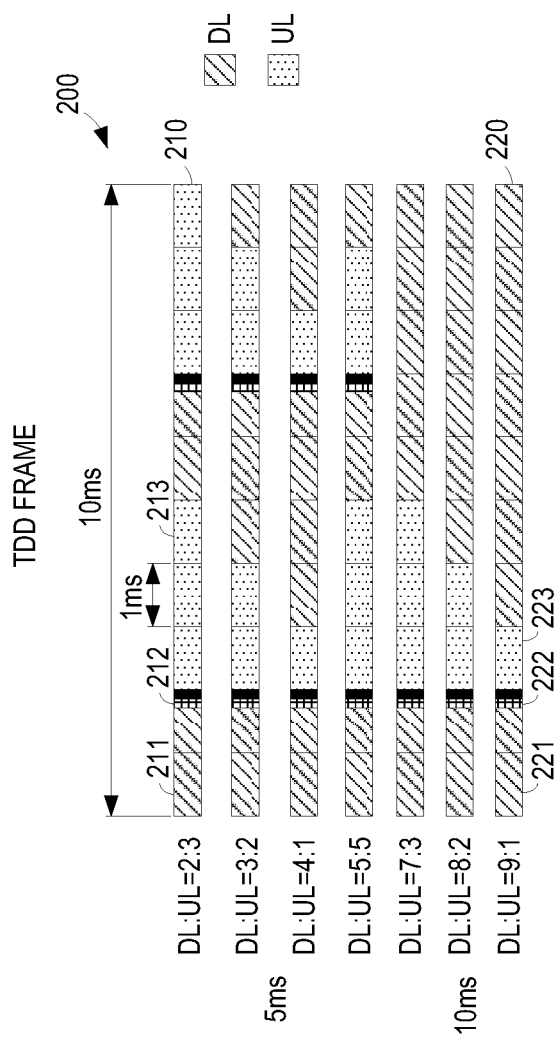
FIG. 2 shows an exemplary time slot distribution in a TDD system.

FIG. 2 shows an exemplary time slot distribution of a TDD frame 200 in a TDD system. As shown in the figure, a TDD frame 200 comprises time slots respective for an uplink (UL) and a downlink (DL). Time Division Duplex is employed for UL and DL, i.e., UL and DL use different time slots respectively, and UL and DL would not exist in the same time slot at the same time.

FIG. 2 shows a time slot division pattern for UL/DL in two types of frame structures of e.g. TD-LTE 3GPP. 5 ms and 10 ms shown at the left side of the figure represent frame lengths of corresponding frame structures respectively.

Taking a TDD frame 210 at the top of the figure as an example, it shows that the TDD frame 210 has a frame length of 5 ms and is divided into five time slots, wherein two time slots 211 are used for DL and three time slots 213 are used for UL. A TDD frame 220 at the bottom of the figure shows that the TDD frame 220 has a frame length of 10 ms and is divided into ten time slots, wherein nine time slots 221 are used for DL and one time slot 223 is used for UL. There may be periods 212 and 222 between DL and UL for separation.

Taking a base station as an example, a time slot for DL can be regarded as a transmitting period for its transmitter, while a UL time slot can be regarded as a receiving period for its receiver. The feature of a TDD system, i.e. only the transmitter is used during a transmitting period, ensures that the receiver in the base station is idle during the transmitting period. As a result, according to an embodiment of the present invention, this idle period may be utilized to adapt correction parameters for the receiver to improve its correction quality.

Alternatively, adaptation of correction parameters may be performed in the periods 212 and 222 when both the transmitter and the receiver are idle.

It shall be understood that although FIG. 2 shows a TD-LTE time slot distribution pattern, it does not necessarily mean that the present invention is only applicable to a TD-LTE system. Rather, in other implementations, the present invention may also be applied to TDD systems having other time slot distribution patterns.

Figure 3:
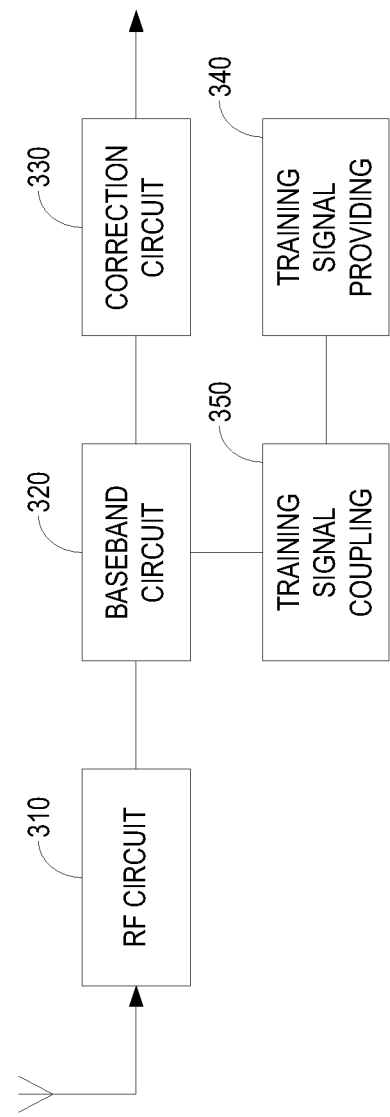
FIG. 3 shows a block diagram of a Zero-IF receiver according to an embodiment of the present invention.

FIG. 3 shows a block diagram of a Zero-IF receiver 300 according to an embodiment of the present invention. As shown in the figure, a Zero-IF receiver 300 comprises an RF circuit 310, a baseband circuit 320 and a correction circuit 330.

The RF circuit 300 receives a RF signal from an antenna and processes the RF signal. In an example, the RF circuit 310 may comprise a filter and a low noise amplifier (as shown in FIG. 1). However, in other implementations, the RF circuit 310 may comprise components other than those depicted in FIG. 1 or additional components.

The baseband circuit 320 receives a RF signal from the RF circuit 310, converts it into a baseband signal and processes it. In an example, the baseband circuit 320 may comprise a demodulator, a channel select filter, and an analog to digital converter (as shown in FIG. 1). However, in other implementations, the baseband circuit 320 may comprise components other than those depicted in FIG. 1 or additional components.

The correction circuit 330 performs correction on a baseband signal received from the baseband circuit 320 using correction parameters to eliminate signal errors induced by problems such as DC offset or I/Q mismatch. The correction circuit 330 is trained based on a training signal to obtain correction parameters that match current receiver circuit condition or circuit characteristic. In an example, the correction circuit 330 may comprise a training module that adapts the correction parameters based on a training signal and a compensating module that corrects a baseband signal based on the correction parameters. These modules are similar to the adapting module and compensating module shown in FIG. 1. However, in other implementations, the correction circuit 330 may comprise components other than those depicted in FIG. 1 or additional components.

According to an embodiment of the present invention, the Zero-IF receiver 300 further comprise a training signal providing part 340 and a training signal coupling part 350.

The training signal providing part 340 is used for providing a training signal to adapt correction parameters. A training signal is a signal used for training the correction circuit 330 to help the correction circuit to derive correction parameters. Preferably, the training signal providing part 340 may provide a training signal by selecting among signals from other signal sources, or otherwise it may be a standalone signal source, and provide a training signal generated by itself. Preferably, the training signal providing part 340 may provide a training signal that the correction circuit 330 knows beforehand in order to enable the correction circuit 330 to adapt the correction parameters by means of non-blind estimation.

The training signal coupling part 350 couples a training signal provided by the training signal providing part 340 to the baseband circuit 320 during an idle period of the receiver so that the correction circuit may adapt the correction parameters based on the training signal. Preferably, the training signal coupling part 350 is implemented as a switch, and the coupling is achieved by directly connecting an output of the training signal providing part 340 to an input of the baseband circuit 320. Alternatively, instead of direct connection, the training signal coupling part 350 may be implemented as a coupler, and the coupling is achieved by feeding the training signal output from the training signal providing part 340 to the baseband circuit via the RF circuit in, for example, a reflective manner. The training signal is received by the correction circuit after being processed by the baseband circuit so that the correction circuit may perform adaptation of the correction parameters. Preferably, the training signal is a specially designed signal dedicated for correction. Preferably, the training signal may be known beforehand by the receiver so as to perform correction based on non-blind estimation.

An idle period refers to a period during which a receiver is idle (e.g. a period during which no signals are to be received), and may include any periods other than the receiving period of the receiver. In the context of a base station, an idle period of a receiver may include, for example, a transmitting period of a transmitter (such as all the time slots occupied by DL in FIG. 2), or separation periods between the transmitting period and receiving period (such as a period between the time slots occupied by DL and UL, e.g. a guard slot).

By correcting a Zero-IF receiver with a training signal provided by a self-contained training signal providing part during an idle period, on one hand, since it is the idle period of the receiver that is used, it is possible to take a relatively long time to adapt the correction parameters, which would allow the use of a relatively complex correction algorithm to improve correction performance. On the other hand, since the training signal is provided by a self-contained training signal providing part, the signal quality thereof is more stable and reliable, which eliminates interference to the correction process caused by distortion of the training signal as much as possible, and improves the correction performance.

It shall be understood that the components of a Zero-IF receiver may include functional components, operating components and/or structural components other than those illustrated in FIG. 3. Moreover, two or more components therein may be implemented in a single component.

It shall be understood that a Zero-IF receiver according to the present invention may be used in a base station in a TDD system. A receiver structure according to the present invention may also be applicable to other direct conversion receivers (e.g. a low-IF receiver). The receiver structure according to the present invention may further be used for monitoring a general receiver in addition to performing correction.

Figure 4:
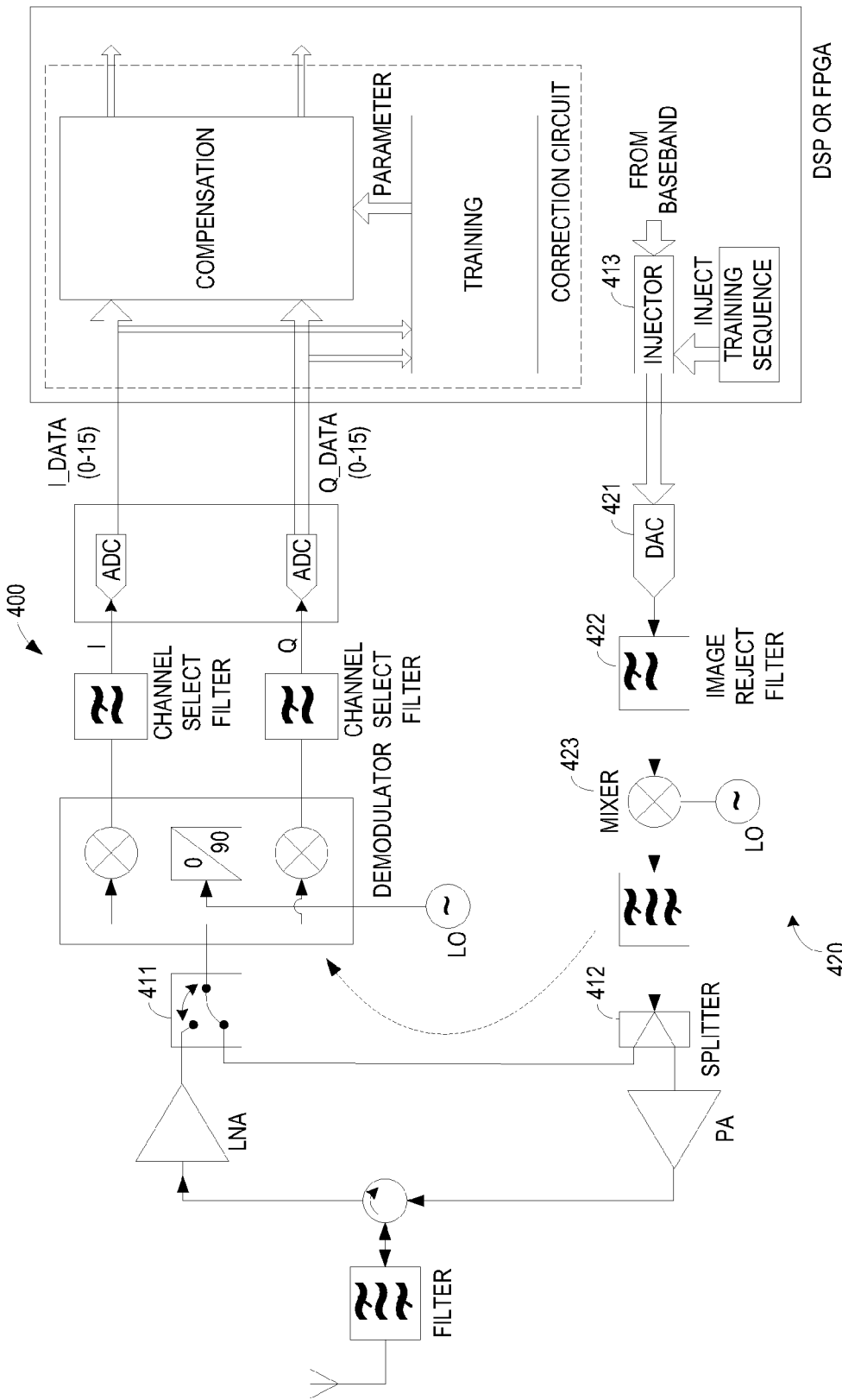
FIG. 4 shows an implementation of a Zero-IF receiver according to an embodiment of the present invention.
Figure 5:
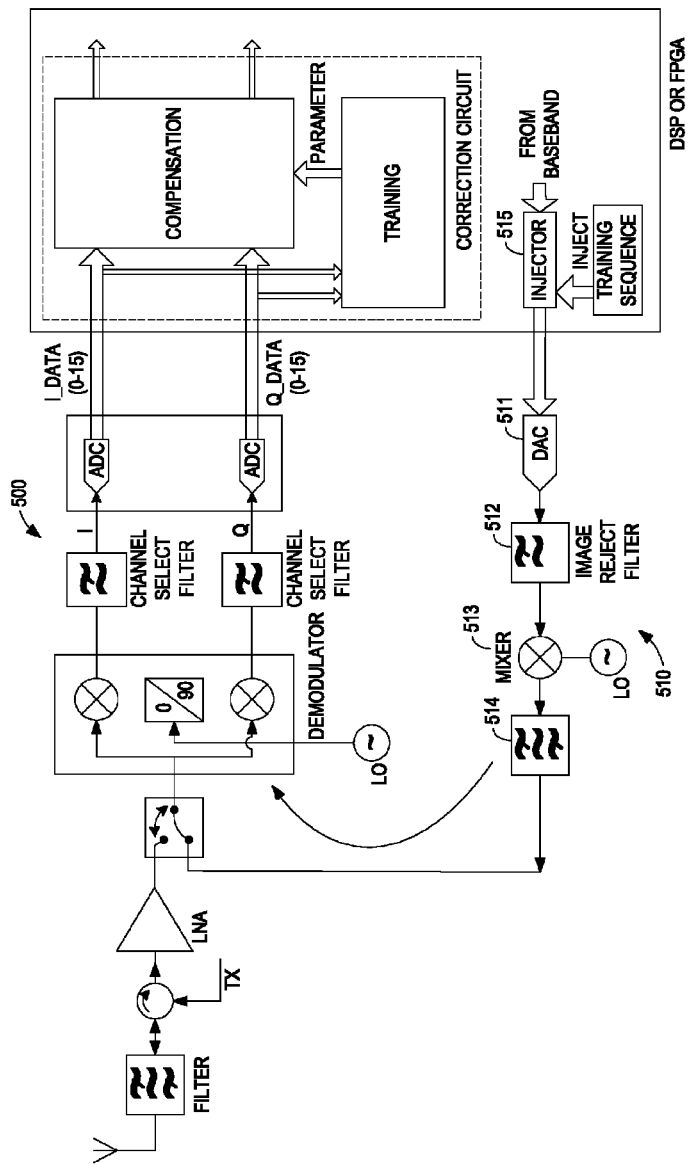
FIG. 5 shows an implementation of a Zero-IF receiver according to another embodiment of the present invention.
Figure 6:
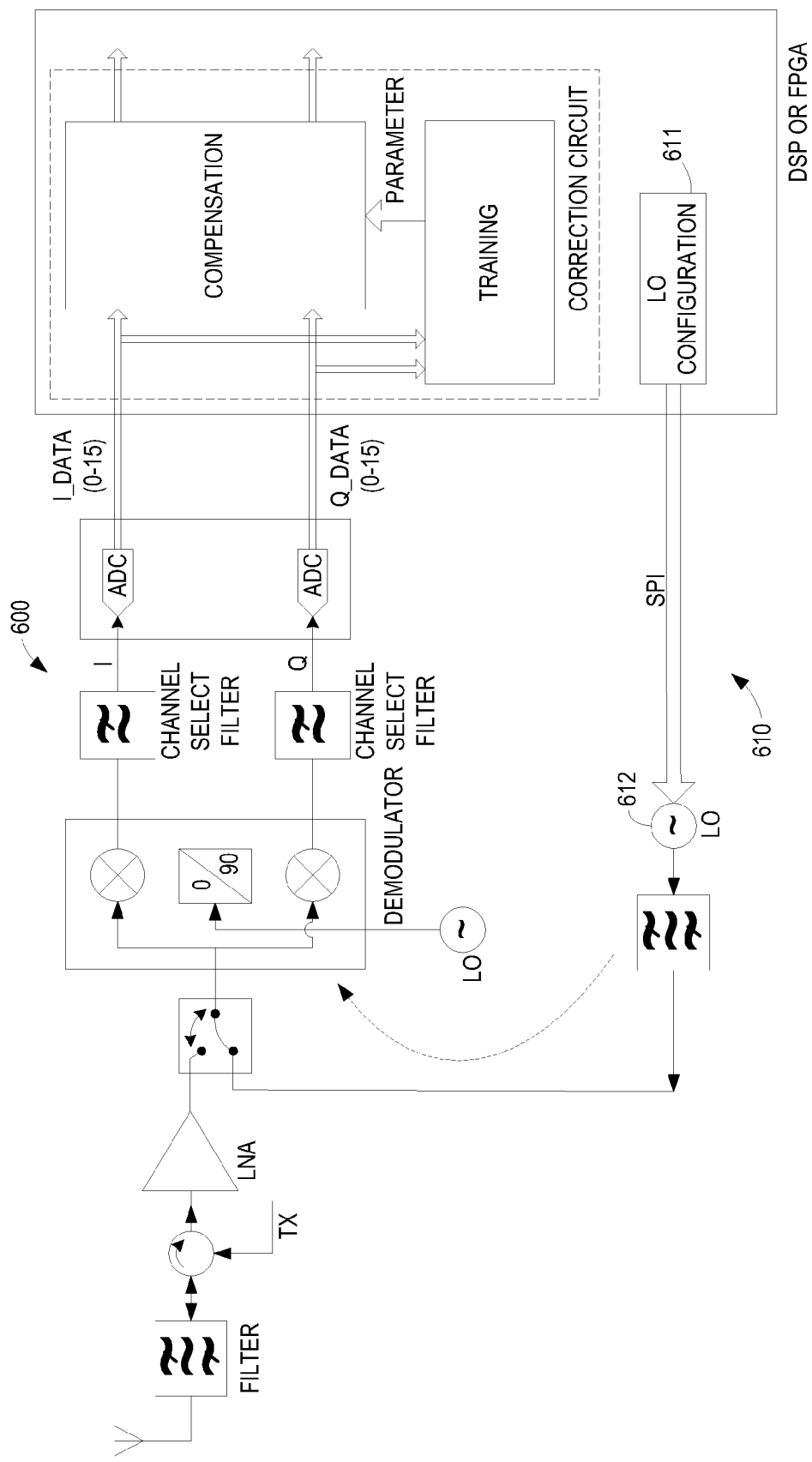
FIG. 6 shows an implementation of a Zero-IF receiver according to a further embodiment of the present invention.

FIGS. 4-6 show several exemplary structures for correction of a Zero-IF receiver in a TDD system according to an embodiment of the present invention.

In a TDD system, a device (for example, a base station or UE) generally comprises a transceiver to transmit and receive signals. The transmitting path and receiving path thereof would operate in a Time Division Duplex manner in DL and UL at the same frequency. Accordingly, a signal (e.g. a traffic signal) transmitted on the transmitting path during a transmitting period of the transceiver (i.e. DL period) may be correctly demodulated and processed by its receiving path.

FIG. 4 shows an implementation of a Zero-IF receiver 400 according to an embodiment of the present invention. Since the Zero-IF receiver 400 herein is used as a receiving path of a transceiver, a transmitting path 420 is also shown in the figure in addition to the Zero-IF receiver 400. According to an embodiment of the present invention, a training signal is provided to the receiver by reusing the transmitting path in a time division manner.

The transmitting path 420 generally comprises an digital to analog converter (DAC) 421, an image reject filter 422, a mixer 423, and a power amplifier (PA) 424, and the like to process signals to be transmitted so that they can be transmitted via an antenna.

The Zero-IF receiver 400 may comprise a RF circuit, a baseband circuit and a correction circuit as described in reference to FIG. 3.

According to an embodiment of the present invention, the Zero-IF receiver 400 further comprises a splitter 412 and a switch 411. The splitter 412 is coupled between the transmitting path 420 and the switch 411 for splitting a signal (e.g. a DL traffic signal) being transmitted on the transmitting path 420 into, for example, two signals such that one of the two signals can still be transmitted via the antenna, while the other one is output from an output of the splitter and provided as a training signal. The switch 411 is preferably coupled with the RF circuit, the baseband circuit and the splitter 412. The switch 411 connects an output of the splitter to an input of the baseband circuit during an idle period of the receiver to feed a training signal provided by the splitter to the baseband circuit for adaptation of the correction parameters. The switch 411 transfers signals from the RF circuit to the baseband circuit during a receiving period of the receiver 410.

Preferably, the splitter 412 may be arranged after a mixer 423 and before a power amplifier 424 on the transmitting path 420 so as to provide a mixed transmitted signal to the baseband circuit. The splitter 412 may cooperate with the switch 411 to split and provide a signal transmitted on the transmitting path as training signal to the baseband circuit during the entire idle period (e.g. transmitting period) or selected portions of the idle period. The correction circuit may use signals transmitted on the transmitting path, including traffic signals for instance, as training signals to adapt the correction parameters.

It is also possible to use a signal specially designed for training the correction circuit as a training signal. As shown in FIG. 4, the Zero-IF receiver 400 may further comprise an injection module 413 for inserting a predefined sequence in a specific transmitting period such as a certain DL time slot in baseband. The sequence is converted into a corresponding specially designed signal after being processed on the transmitting path. In such a situation, the switch 411 connects the splitter 412 with the baseband circuit within at least a period corresponding to this specially-designed signal so as to provide this signal to the correction circuit for training. According to one example, in the DL time slot, this sequence may be positioned after antenna calibration data or designed as a specific sequence that can be used for both antenna calibration and receiver correction. Preferably, the specific sequence may be known beforehand by the Zero-IF receiver so as to perform the correction based on non-blind estimation.

According to the above described embodiments of the present invention, the Zero-IF receiver uses the signal transmitted on the transmitting path of the transceiver as a training signal. Compared with an existing technical solution in which a received UE signal is used as a training signal, a signal derived by splitting on the transmitting path is not transmitted in the air. It will not suffer from interference outside or be influenced by multipath effect, etc. Thus the quality of signal is more stable and reliable, and the power thereof is controllable. When such a signal is used for training the correction circuit, the obtained correction parameters would be more accurate.

According to an embodiment of the present invention, a dedicated training signal generation circuit may also be used to provide a training signal.

FIG. 5 shows an implementation of a Zero-IF receiver 500 according to another embodiment of the present invention, where a dedicated upconversion transmitting circuit is used to provide the training signal.

In FIG. 5, in addition to a RF circuit, a baseband circuit, a correction circuit and a training signal coupling part as described in FIG. 4, the Zero-IF receiver 500 may alternatively or additionally comprise a dedicated upconversion transmitting circuit 510 to generate and provide the training signal. As shown in FIG. 5, the dedicated upconversion transmitting circuit 510 generally comprises a digital-analog converter 511, an image reject filter 512 and a mixer 513, etc. to simulate a transmitting circuit for transmitting signals so as to provide the receiver with a signal that can be received and used by the receiver as the training signal.

It shall be understood that although the structure of the dedicated upconversion transmitting circuit 510 is similar to that of the transmitting path of the transceiver in FIG. 4, it forms a dedicated and separate path. In other implementations, the upconversion transmitting circuit 510 according to the present invention may comprise components other than those depicted in FIG. 5 or additional components.

Using a dedicated up-conversion transmitting circuit to provide training signals enables a Zero-IF receiver to obtain a training signal for correction without depending on the signals transmitted on the transmitting path. This makes it possible to make little modification to the structure of the transmitting path of the transceiver. Even if a specially-designed training signal is to be provided, no sequence injection is required to be taken into account in design of the transmitting path of a transceiver. Meanwhile, time slot control for a transmitting path would not be complicated, which makes the overall structure of the transceiver simpler. In addition, since the performance requirement on a dedicated upconversion transmitting circuit is less strict than that on a transmitting path, the dedicated upconversion transmitting circuit can be implemented with a simpler structure and cheaper components.

According to one embodiment, the dedicated upconversion transmitting circuit 510 may receive a traffic signal in baseband to be transmitted, which is provided as a training signal after being up converted. Alternatively, the dedicated upconversion transmitting circuit 510 may be further used as a source of an independently-designed training signal, comprising an injector 515 for injecting a specific training sequence, in particular, a long training sequence, so as to support a specifically-designed training signal. Here, the training signal may also be provided in almost all of an idle period of the receiver, including, e.g., a transmitting period of a transmitter and a guard period, and the like. A long training sequence may enable a correction algorithm in the correction circuit to perform iteration for multiple times, thereby improving the adaptation precision of the correction parameters. The data of the training sequence may be pre-stored in a device (such as FPGA/DSP) close to the DAC side to form a complete closed loop correction without relying on a baseband pool. This structure of the Zero-IF receiver also supports non-blind estimation.

FIG. 6 shows a structure of a Zero-IF receiver 600 according to a further embodiment of the present invention. Here, a training signal is provided by a dedicated Local Oscillator (LO)-based circuit 610.

In FIG. 6, in addition to a RF circuit, a baseband circuit, a correction circuit and a switch as described in FIG. 4, the Zero-IF receiver 600 alternatively or additionally comprises a dedicated Local Oscillator LO-based circuit 610 for providing a training signal. Compared with the structure shown in FIG. 5, the circuit used in FIG. 6 is simpler.

The dedicated circuit 610 comprises an LO configuring module 611 for configuring a frequency point of a phase-locked-loop Local Oscillator LO 612 through a serial communication protocol (SPI) bus. The Local Oscillator LO 612 generates a single frequency signal at a corresponding frequency point dependent on LO configuration parameters from the LO configuring module 611. After being filtered, the single frequency signal is provided as a training signal. The frequency of the single frequency signal is consistent with that of the LO used in the baseband circuit and is within the range of effective receiving frequency band of the Zero-IF receiver. It shall be understood that in other implementations, the circuit 610 according to the present invention may comprise other components than those depicted in FIG. 6 or additional components.

In the present embodiment, since only a continuous sinusoidal wave single frequency signal, a CW signal, generated by the Local Oscillator 612 is provided as a training signal to the correction circuit for estimation and adaptation of correction parameters, a correction algorithm adaptive for a CW signal is preferably used for correction. Moreover, since a receiver correction may be needed on an overall available receiving frequency band, it is preferred to sweep individual LO signals on an expected band, namely the Local Oscillator LO 612 may generate LO signals at a plurality of frequency points. Also, all the idle period of a receiver may be used for such a structure.

Figure 7:
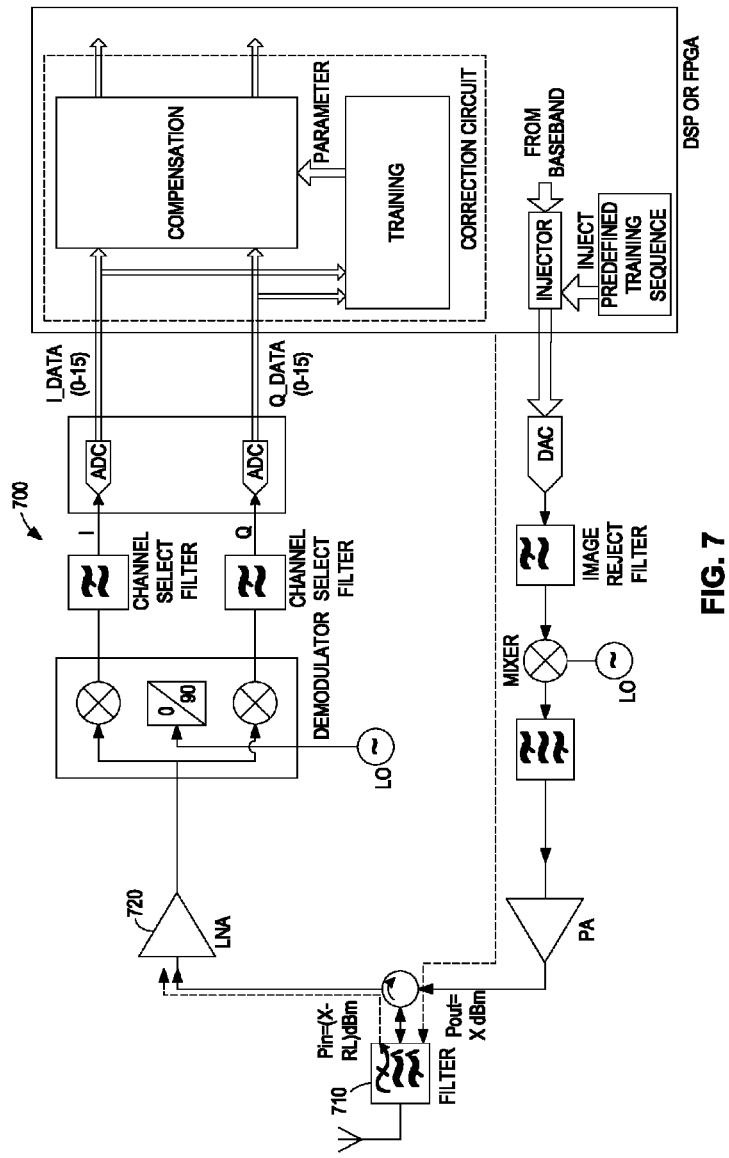
FIG. 7 shows an implementation of a Zero-IF receiver according to a further yet embodiment of the present invention.

FIG. 7 shows a structure of a Zero-IF receiver 700 according to a further embodiment of the present invention, which uses a reflected reference signal transmitted over the transmitting path as a training signal.

Taking a TDD LTE system as an example, there is a specific time slot between TX time slot and RX time slot in a frame structure thereof, in which a guard period is set. According to an embodiment of the present invention, the guard period can be utilized to achieve the correction and supervision of a Zero-IF receiver. Preferably, a specially-designed training sequence can be transmitted during the guard period.

As shown in FIG. 7, when a reference signal transmitted over the transmitting path reaches a filter, partial energy thereof would be reflected to a receiving path of the receiver, for example, to the low noise amplifier 720 in the RF circuit. This utilizes the inherent characteristics of a connecting port of the filter 710. Provided that the transmission power is X dBm, the input return loss of the filter is Y dBm, then the signal power reflected to the receiving path is (X-Y) dBm. The signal reflected to the receiving path may be used as a training signal for receiver correction.

Preferably, a relatively low transmission power is selected for the reference signal during the guard period such that the low noise amplifier of the receiver may be in its best operating condition, and energy radiated to outside space is meanwhile reduced. As such, the signal power received by the receiving circuit will be high enough to meet the requirement on a signal-to-noise ratio during training of the correction circuit, while no interference to other users will be induced by outward radiation via antenna with high power.

Preferably, a limiter may be added before the low noise amplifier to reduce signal power reflected into the low noise amplifier so as to prevent the lower noise amplifier from being impaired by high signal power.

Preferably, a measurement circuit may be comprised to measure the input return loss of the filter.

Figure 8:
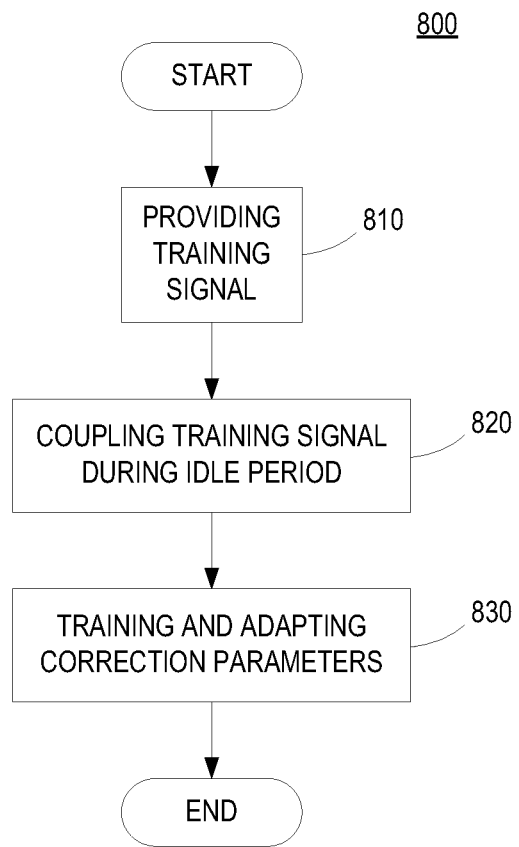
FIG. 8 shows a flow chart of a correction method according to an embodiment of the present invention.

FIG. 8 shows a flow chart of a correction method 800 for a Zero-IF receiver according to an embodiment of the present invention. As described above, the Zero-IF receiver comprises, among others, a training signal providing part and a training signal coupling part.

As shown in the figure, in step 810 the training signal providing part provides a training signal for adapting correction parameters in a correction circuit of the Zero-IF receiver. In one implementation, when the Zero-IF receiver acts as a receiving path of a transceiver, a signal transmitted on the transmitting path of the transceiver is provided as a training signal. This may be achieved by inserting a splitter in the transmitting path to supply a signal split from the transmitted signal as the training signal. Preferably, in baseband a predefined sequence is inserted in a predetermined time slot for transmission of the transmitting path so as to provide a specific training signal. In another implementation, a dedicated upconversion transmitting circuit is used as the training signal providing part, and the training signal is provided by upconverting a baseband signal by means of the dedicated upconversion transmitting circuit. In a further implementation, a dedicated Local Oscillator-based circuit is used as the training signal providing part, and the training signal is provided by generating a continuous sinusoidal wave single frequency signal by means of the dedicated Local Oscillator based circuit.

In step 820, the training signal coupling part couples the training signal from the training signal providing part to the baseband circuit of the Zero-IF receiver when the receiver is in its idle period. In one implementation, when a signal transmitted on the transmitting path is provided as the training signal, the coupling can be for example performed in such a way that the transmitted signal is reflected to the RF circuit of the Zero-IF receiver and in turn fed into the baseband circuit, or the splitter is directly connected to the baseband circuit so as to supply a signal split from the transmitted signal as the training signal. Preferably, the training signal coupling part performs the coupling during a guard period between the transmitting period and receiving period. Alternatively, the coupling can also be performed during the entire period of an idle period so as to provide the correction circuit with a long training sequence, or performed during preselected portions of an idle period so as to provide a predefined training sequence inserted in corresponding portions.

In step 830, the correction circuit receives the training signal processed by the baseband circuit and adapts correction parameters based on the training signal so as to correct baseband signals from the baseband circuit. In one implementation, when the training signal is already known, the correction circuit performs the adaptation on the basis of the received training signal, the knowledge known beforehand about the training signal, and the current correction parameters.

It shall be pointed out that the above statements of the exemplary embodiments provide illustration and description, but is not intended to be exhaustive or to limit the invention to the precise form disclosed. Modifications and variations are possible in light of the above teachings or may be acquired from practice of the invention. For example, while a series of acts and/or processes have been described with regard to FIG. 8, the order of the acts and/or processes may be modified in other implementations.

It shall be emphasized that the term "comprises" or "comprising" when used in the specification is taken to specify the presence of stated features, integers, steps or components, but does not preclude the presence or addition of one or more of other features, integers, steps, components, or groups thereof.

Moreover, as those skilled in the art would appreciate, the present invention may be embodied as a method, apparatus, or computer program product. Accordingly, the present invention may take the form of an entirely hardware embodiment, an entirely software embodiment (including firmware, resident software, microcode, etc.), or an embodiment combining software and hardware aspects that may all generally be referred to herein as a "circuit", "component" or "system". Furthermore, the present invention may take the form of a computer program product on a computer usable storage medium having computer usable program codes embodied in the medium.

Although specific embodiments have been illustrated and described herein, those skilled in the art would appreciate that any arrangements intended to achieve the same purposes may be substituted for the specific embodiments as shown, and the present invention have other applications in other environments. The present application is intended to cover any adaptations or variations of the present invention. The following claims are in no way intended to limit the scope of the present invention to the specific embodiments described herein.

The invention claimed is:

1. A system, comprising:
a transmitter configured to:
convert a training signal to a first transmit radio frequency (RF) signal;
convert the first transmit RF signal to a second transmit RF signal and a third transmit RF signal; and
send the second transmit RF signal and the third transmit RF signal during a non-time division duplex (TDD) receive period; and
a zero intermediate frequency (Zero IF) receiver operationally coupled to the transmitter and configured to:
receive the second transmit RF signal during the non-TDD receive period to obtain a first received RF signal;
convert the first received RF signal to a received training signal; and
send the received training signal, wherein the received training signal is used to adapt correction parameters associated with the Zero IF receiver.

2. The system of claim 1, wherein the non-TDD receive period is the TDD transmit period.

3. The system of claim 1, wherein the non-TDD receive period is a guard period between a TDD transmit period and a TDD receive period.

4. The system of claim 1, wherein converting the first transmit RF signal includes the transmitter being further configured to:
split, by a splitter of the transmitter, the first transmit RF signal into the second transmit RF signal and the third transmit RF signal.

5. The system of claim 1, wherein converting the first transmit RF signal includes the transmitter being further configured to:
reflect, by a filter of the transmitter, the first transmit RF signal to obtain the second transmit RF signal; and
filter, by the filter, the first transmit RF signal to obtain the third transmit RF signal.

6. The system of claim 1, wherein the training signal includes a predefined sequence in a predetermined TDD time slot.

7. The system of claim 1, wherein the Zero IF receiver is further configured to include a switch, wherein the switch is configured to:
receive, from the transmitter, the second transmit RF signal during the TDD transmit period.

8. The system of claim 7, wherein the switch is further configured to:
receive, from an antenna, a second received RF signal during the TDD receive period.

9. The system of claim 1, further comprising:
a correction circuit operationally coupled to the Zero IF receiver and configured to:
receive, from the Zero IF receiver, the received training signal; and
adapt the correction parameters using the received training signal.

10. The system of claim 9 wherein the correction circuit is further configured to:
adapt the correction parameters using the training signal and the received training signal.

11. A method, comprising:
converting, by the transmitter, a training signal to a first transmit radio frequency (RF) signal;
converting, by the transmitter, the first transmit RF signal into a second transmit RF signal and a third transmit RF signal;
sending, by the transmitter, the second transmit RF signal and the third transmit RF signal during a non-time division duplex (TDD) receive period;
receiving, at a zero intermediate frequency (Zero IF) receiver, the second transmit RF signal during the during a non-time division duplex (TDD) receive period to obtain a first received RF signal;
converting, by the Zero IF receiver, the first received RF signal to a received training signal; and
sending, from the Zero IF receiver, the received training signal, wherein the received training signal is used to adapt correction parameters associated with the Zero IF receiver.

12. The method of claim 11, wherein the non-TDD receive period is the TDD transmit period.

13. The method of claim 11, wherein the non-TDD receive period is a guard period between a TDD transmit period and a TDD receive period.

14. The method of claim 11, wherein converting the first transmit RF signal includes:
splitting, by a splitter of the transmitter, the first transmit RF signal into the second transmit RF signal and the third transmit RF signal.

15. The method of claim 11, wherein converting the first transmit RF signal includes:
reflecting, by a filter of the transmitter, the first transmit RF signal to obtain the second transmit RF signal; and
filtering, by the filter, the first transmit RF signal to obtain the third transmit RF signal.

16. The method of claim 11, wherein the training signal includes a predefined sequence in a predetermined TDD time slot.

17. The method of claim 11, wherein receiving the second transmit RF signal during the TDD transmit period includes:
receiving, at a switch of the Zero IF receiver, from the transmitter, the second transmit RF signal during the TDD transmit period.

18. The method of claim 17, further comprising:
receiving, at a switch of the Zero IF receiver, from an antenna, a second received RF signal during the TDD receive period.

19. The method of claim 11, further comprising:
receiving, at a correction circuit, from the Zero IF receiver, the received training signal; and
adapting, by the correction circuit, the correction parameters using the received training signal.

20. The method of claim 19, wherein adapting the correction parameters includes:
adapting, by the correction circuit, the correction parameters using the training signal and the received training signal.

* * * * *

UNITED STATES PATENT AND TRADEMARK OFFICE
CERTIFICATE OF CORRECTION

Page 1 of 1

PATENT NO.         : 9,166,643 B2
APPLICATION NO.    : 13/664493
DATED              : October 20, 2015
INVENTOR(S)        : He It is certified that error appears in the above-identified patent and that said Letters Patent is hereby corrected as shown below:

In the specification

Column 3, Line 55, delete "filter 100" and insert -- filter 110 --, therefor.

Signed and Sealed this
First Day of March, 2016

Michelle K. Lee
*Director of the United States Patent and Trademark Office*